United States Patent
Breda

(10) Patent No.: US 7,059,349 B2
(45) Date of Patent: Jun. 13, 2006

(54) MULTIPORT DIVERTER VALVE

(76) Inventor: Silvano Breda, 125 Limestone Crescent, Downsview, Ontario (CA) M3J 2R1

( * ) Notice: Subject to any disclaimer, the term of this patent is extended or adjusted under 35 U.S.C. 154(b) by 336 days.

(21) Appl. No.: 10/657,226

(22) Filed: Sep. 9, 2003

(65) Prior Publication Data
US 2004/0050432 A1    Mar. 18, 2004

(30) Foreign Application Priority Data
Sep. 10, 2002   (CA) .................................. 2402094

(51) Int. Cl.
*F16K 11/74*  (2006.01)
(52) U.S. Cl. .......................... 137/625.11; 137/625.15; 137/625.47
(58) Field of Classification Search ........... 137/625.11, 137/625.12, 625.15, 625.46, 625.47
See application file for complete search history.

(56) References Cited

U.S. PATENT DOCUMENTS

| | | | | |
|---|---|---|---|---|
| 1,228,469 A | * | 6/1917 | Mueller ................. | 137/625.11 |
| 2,198,386 A | * | 4/1940 | Hiester et al. ......... | 137/625.11 |
| 2,830,564 A | * | 4/1958 | Bryant ................... | 137/625.11 |
| 2,979,082 A | * | 4/1961 | Neves .................... | 137/625.11 |
| 4,574,842 A | * | 3/1986 | Cordova ................. | 137/625.46 |
| 4,968,334 A | * | 11/1990 | Hilton ................... | 137/625.47 |
| 6,196,266 B1 | | 3/2001 | Breda .................... | 137/625.11 |

FOREIGN PATENT DOCUMENTS

| | | | |
|---|---|---|---|
| GB | 2345950 | * | 7/2000 |
| WO | WO 01/66983 | * | 9/2001 |

* cited by examiner

*Primary Examiner*—John Rivell
(74) *Attorney, Agent, or Firm*—Neil H. Hughes; Ivor M. Hughes; Marcelo Sarkis

(57) ABSTRACT

A diverter valve including a cylindrical housing having a water inlet, and water outlets. The valve contains a removable cartridge for alignment of the water inlet to one of the water outlets. The cartridge includes a stationary sleeve having water outlet ports permanently aligned with and sealed in relation to the water outlets, and a rotary stem sleeve within said stationary sleeve having an inlet, at least one outlet, and a handle spindle extending from said valve. The stationary sleeve including a ceramic disk proximate the bottom and including a water inlet port for registration with the water inlet. The stem sleeve carrying a ceramic disk moveable in and out of registration with the water inlet port. The rotary stem sleeve may be rotated to close and open said water inlet port, to selectively align the outlet of the stem sleeve with the outlets of said stationary sleeve.

5 Claims, 22 Drawing Sheets

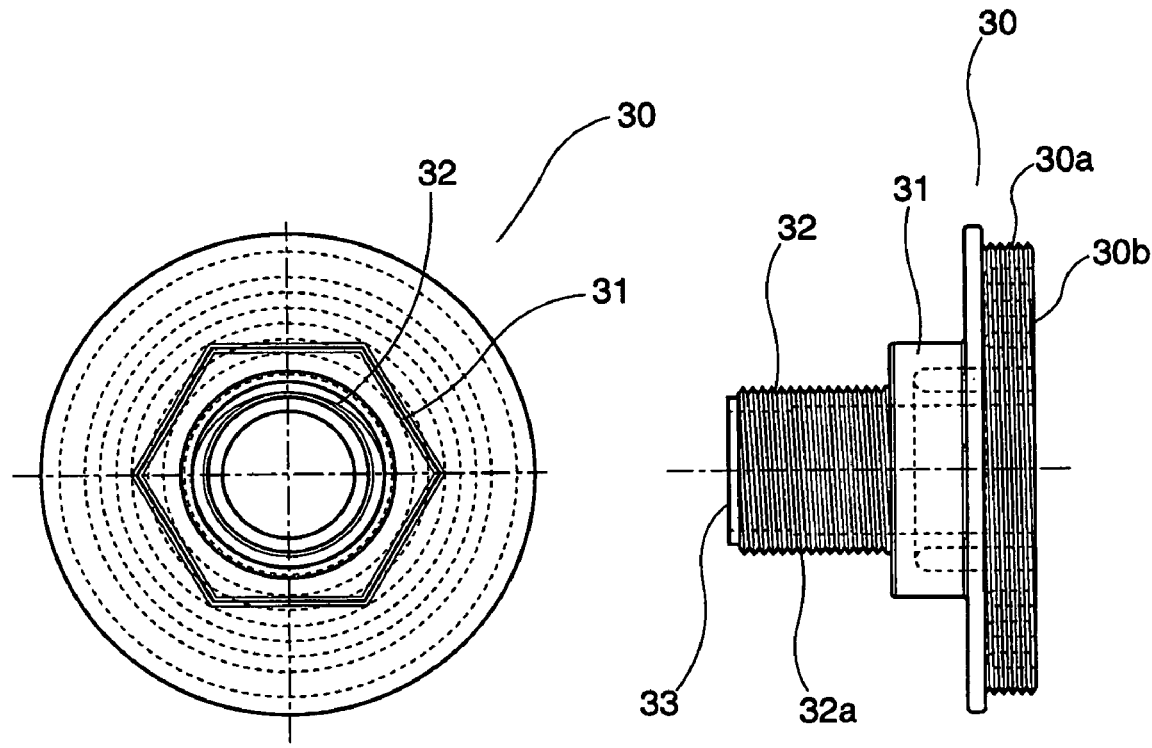
Figure 1A
Figure 1C
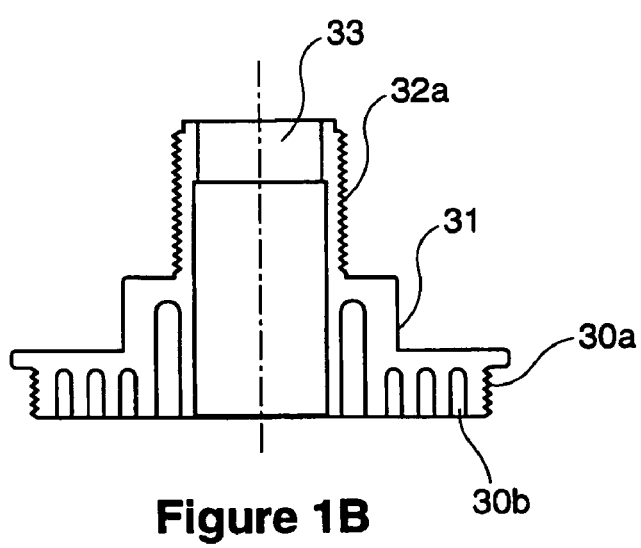
Figure 1B

Section "A-A"

Section "C-C"

Section "B-B"

Section "A-A"

Section "B-B"

MULTIPORT DIVERTER VALVE

FIELD OF INVENTION

This invention relates to diverting valve assemblies and particularly to improvements to multiport diverting valve assemblies which simplify the prior structure of Applicant.

BACKGROUND OF THE INVENTION

In Applicant's prior Patent Application No. 6,196,266 there is taught a multiport diverting valve which allow having many advantages as set out in the Background of the Invention in that patent, which is hereby incorporated by reference, there were several limitations which are addressed by the present invention. In particular, the prior valve was not embodied in a cartridge but in a kit of components. In particular, the valve was complicated by the requirement of various clips, stops and the like which are best seen in the figures and the descriptions relating thereto which make the repair and replacement of such an assembly or an adjustment thereof more complicated than is necessary. It would be advantageous to provide a multiport diverter valve in a cartridge form which merely would require replacement of the cartridge in a simple straight forward manner without the necessity of having to remove clips, stops and the like and which require complicated assembly.

The present invention therefore accomplishes many of the objectives of the prior teachings of U.S. Pat. No. 6,196,266 in a simplified valve construction that does not require a kit but is provided in a cartridge assembly which may be removed from the housing and discarded when repair is necessary.

Also, it is therefore an object of the invention to provide a multiport diverting valve including a cartridge assembly which includes a ceramic disk in the inlet of the valve to improve the reliability and life of the cartridge assembly.

Further and other objects of the invention will become apparent to those skilled in the art when considering the following summary of the invention and the more detailed description of the preferred embodiments illustrated herein.

SUMMARY OF THE INVENTION

According to one aspect there is provided a diverter valve comprising, a preferably cylindrical housing having a perimeter, and a water inlet, preferably disposed below, a plurality of water outlets disposed at predetermined spaced intervals about the perimeter of said housing, said diverting valve containing a removable cartridge disposed in said housing for selectively aligning the water inlet of said housing to at least one of the plurality of water outlets of said housing, said cartridge including a stationary sleeve having a plurality of water outlet ports disposed at predetermined spaced intervals and permanently aligned with and sealed in relation to said plurality of water outlets of said housing when said removable cartridge is installed in said housing, said cartridge including a rotary stem sleeve contained within said stationary sleeve, said rotary stem sleeve having an inlet, at least one outlet, and a handle spindle connected to said rotary stem sleeve and extending from said diverter valve for manually rotating said rotary stem sleeve within said cartridge, said stationary sleeve including a preferably ceramic disk disposed therewith preferably proximate the bottom of said stationary sleeve and including a water inlet port in registration with the water inlet of said housing to allow water to enter the cartridge, said rotary stem sleeve including an interior and carrying a preferably ceramic disk therein moveable in and out of registration with the water inlet port of said ceramic disk of said stationary sleeve when said rotary stem sleeve is rotated to fully close and open said water inlet port and thereby allow water to enter said cartridge and to thereafter selectively align the at least one outlet of said rotary stem sleeve with at least one of the plurality of water outlets of said stationary sleeve and said housing by the pre-selected degree of rotation of said rotary stem sleeve.

In one embodiment the housing has a threaded interior substantially proximate an open end thereof for receiving said cartridge and for engagement with a threaded retainer provided with said valve to removably retain the cartridge within said housing, said threaded retainer also having an opening for said spindle preferably a cylindrical collar, which may be threaded on the exterior thereof to allow attachment of appropriate trim portions adjacent a handle.

Preferably said spindle extending from said rotary stem sleeve is made from plastic material, but the handle engaging fitting is made from brass and is retained in said spindle.

Preferably said housing includes a bottom and has contained therewith a seal, preferably generally FIG. 8 in shape to seal the inlet to the valve in relation to the rotating and stationary ceramic disks.

Preferably said housing includes a channel and said cartridge includes a mating tab to ensure correct alignment of all functions of said valve.

In another embodiment of the invention there is a threaded retainer for retaining a cartridge in a cartridge opening of a housing, said opening being threaded about the perimeter thereof, said retainer also being threaded about the perimeter thereof for engagement with the threaded perimeter of said housing to retain said cartridge, and having a cylindrical boss extending therefrom having a hollow for receipt of a stem of said cartridge in use, and being threaded on the exterior thereof to receive trim parts for the valve.

BRIEF DESCRIPTION OF THE FIGURES

FIGS. 1A, 1B and 1C are top end and cross sectional views of the retaining member (30) of FIG. 1 illustrated in a preferred embodiment of the invention.

DETAILED DESCRIPTION OF THE DRAWINGS

Referring now generally to the figures, improvements to a multiport diverting valve assembly, when viewed in relation to the figures of U.S. Pat. No. 6,196,266. Of particular improvement the assembly is a current invention is not in kit form which required one of some degree of skill to assemble in order to provide for the correct location of the limitation of the angle of travel of the stem sleeve in relation to the stationary sleeve with various o-rings and the like, and spring loaded key stop members such as item 146 are provided along with a spine insert with tapered shoulders which provides a wedging action to retain and locate various members within the multiport valve assembly.

Figure 3:
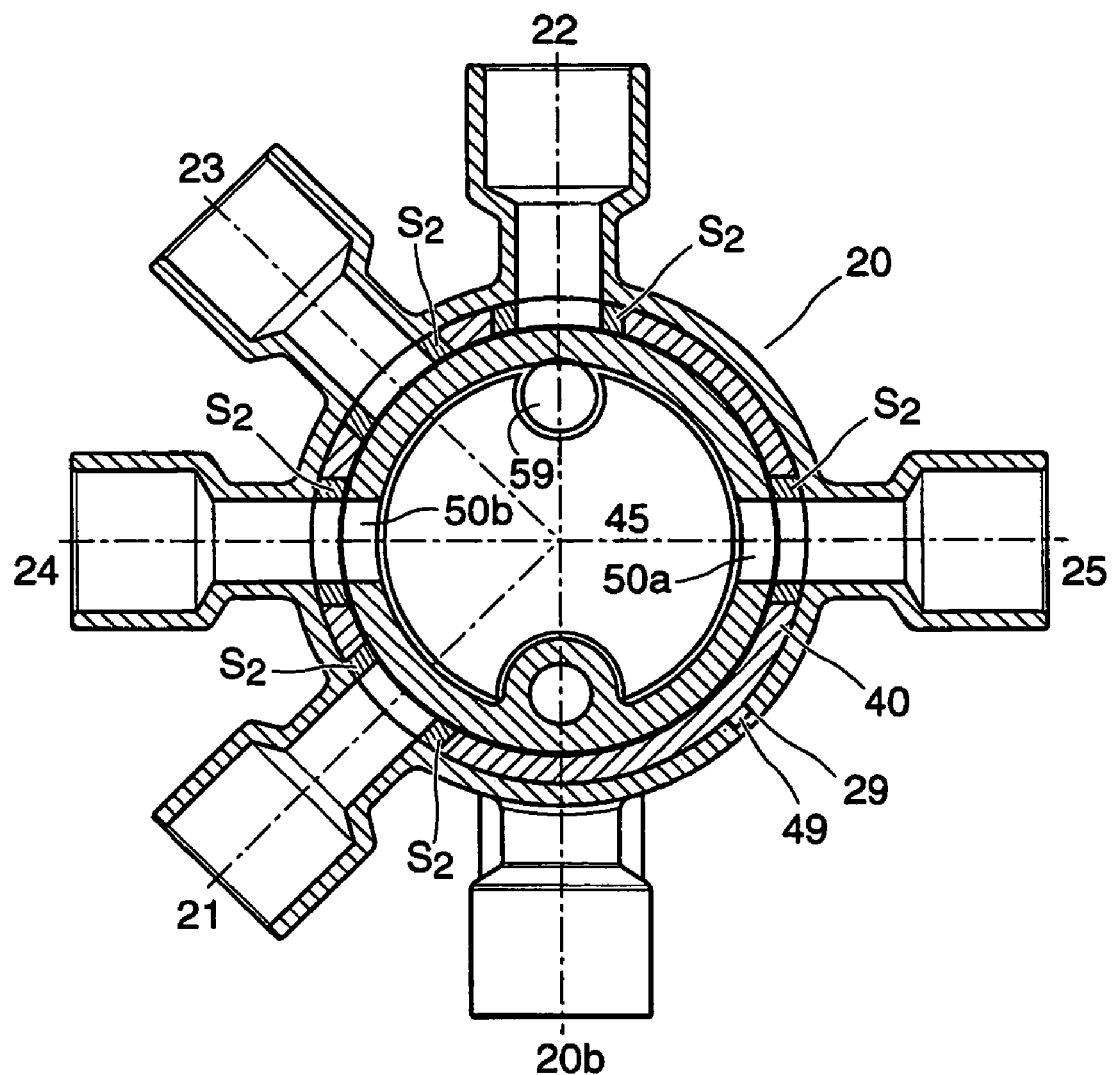
FIG. 3 is a schematic top cross sectional view of the operation of the diverter valve shown in a preferred embodiment of the invention.

The current assembly obviates all those extra members and simplifies entire assembly by providing a multiport diverting valve (10) including a cartridge (15) which includes a stationary sleeve (40) and moveable or rotary stem sleeve (50) contained therein in order to provide selective alignment for the water path to the various output facilities as seen in FIG. 3. By the rotation therefore of the stem sleeve (50) in relation to the stationary sleeve (40) the water entering the valve can be directed to any of the facilities shown. By providing the entire assembly in cartridge form repairs become extremely simple. Further, by providing a ceramic disk installed with the stationary sleeve (40) and a ceramic disk provided with the moveable stem sleeve (50) a much more reliable water shut off and seal can be provided. The grommets (S2) provided with the stationary sleeve (40) are much simplified in relation to U.S. Pat. No. 6,196,266 and therefore not only reduce the expense in replacing grommets but function equally well.

Figure 1:
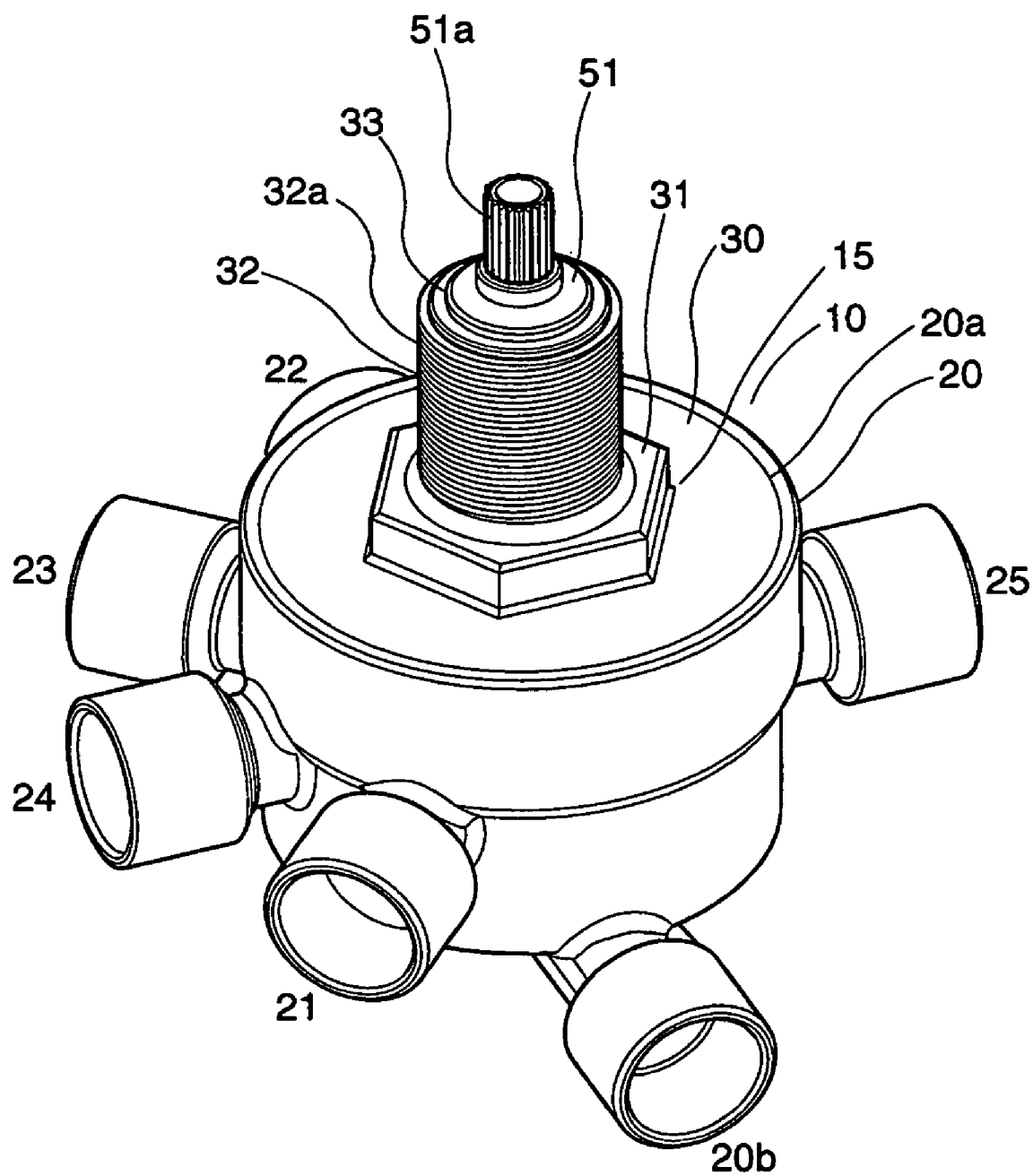
FIG. 1 is a perspective view of the improved multiport diverting valve illustrated in a preferred embodiment of the invention.
Figure 1D:
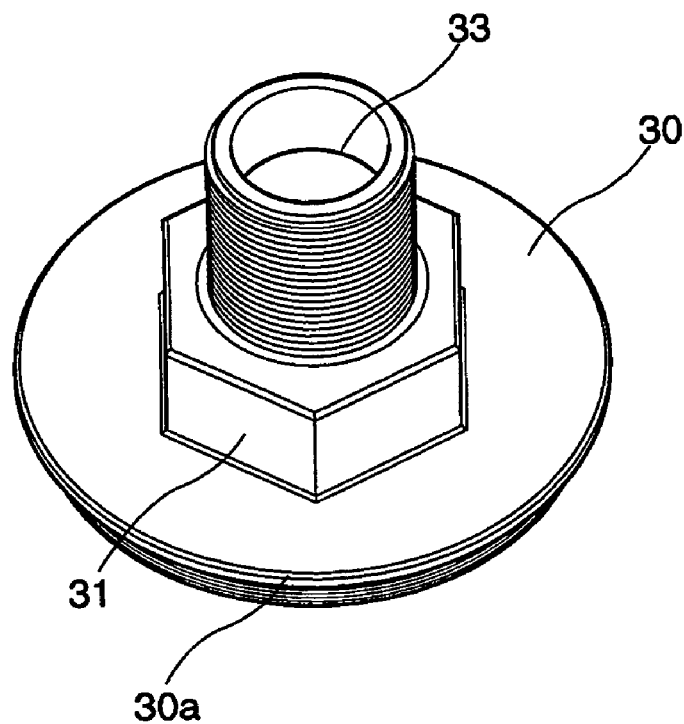
FIGS. 1D and 1E are top and bottom perspective views of the retaining member of FIG. 1B illustrated in a preferred embodiment of the invention.
Figure 1E:
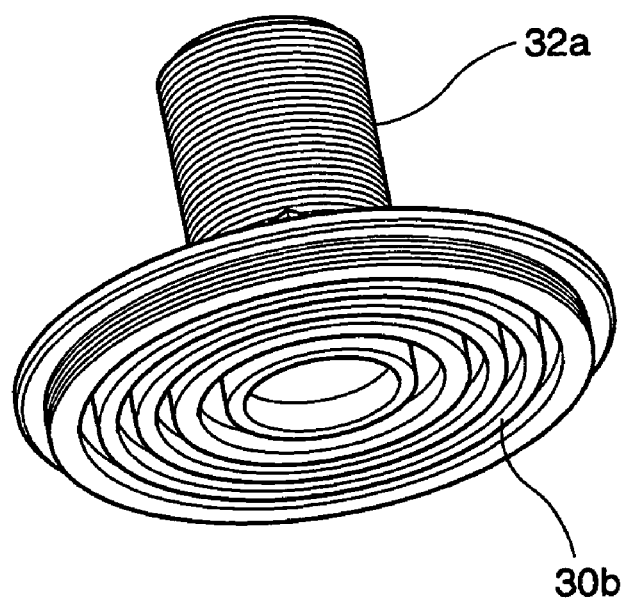
Figure 2:
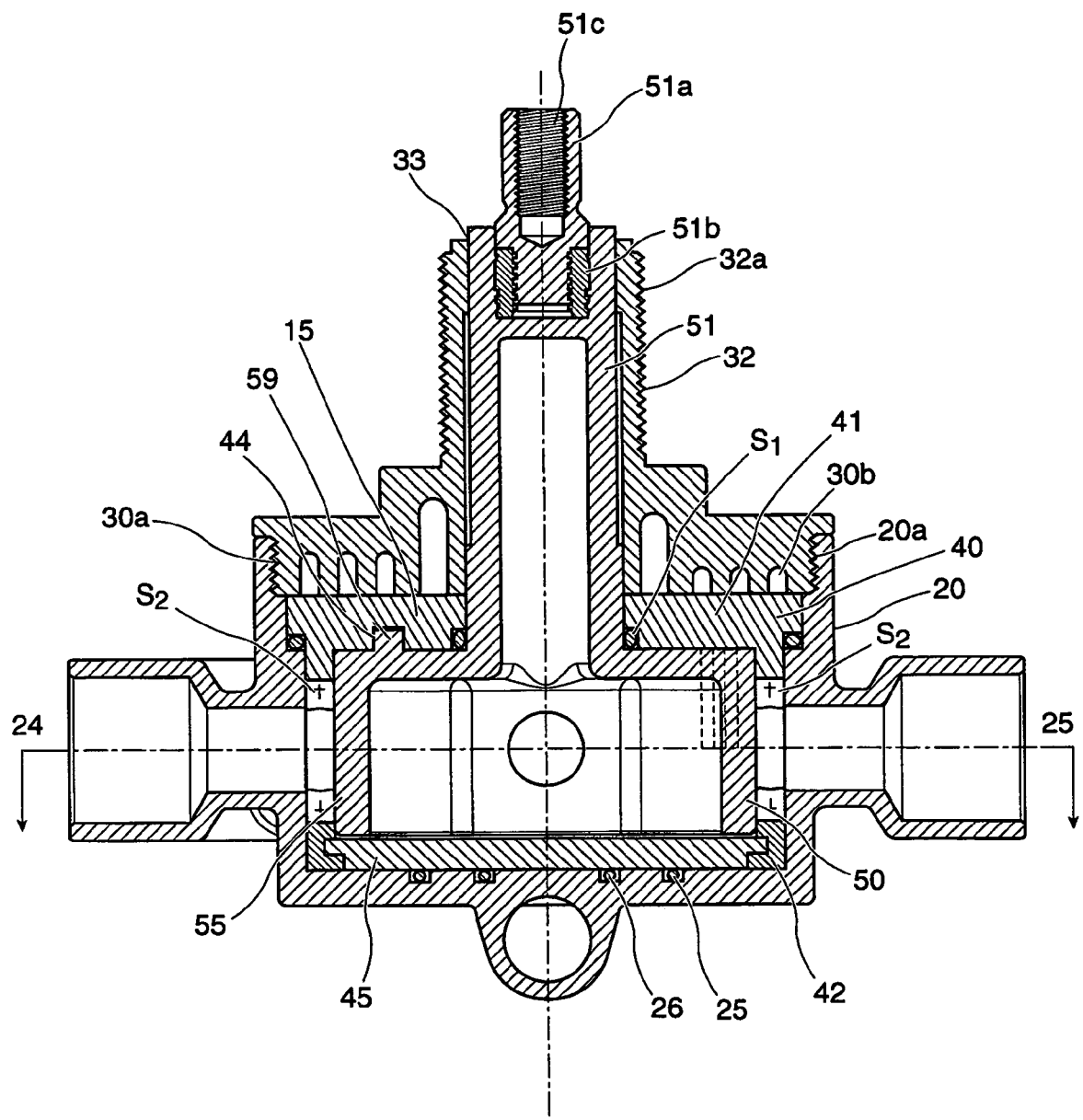
FIG. 2 is a cross sectional view of the multiport valve of FIG. 1 along the center line of the ports (24 and 25) illustrated in a preferred embodiment of the invention.
Figure 2A:
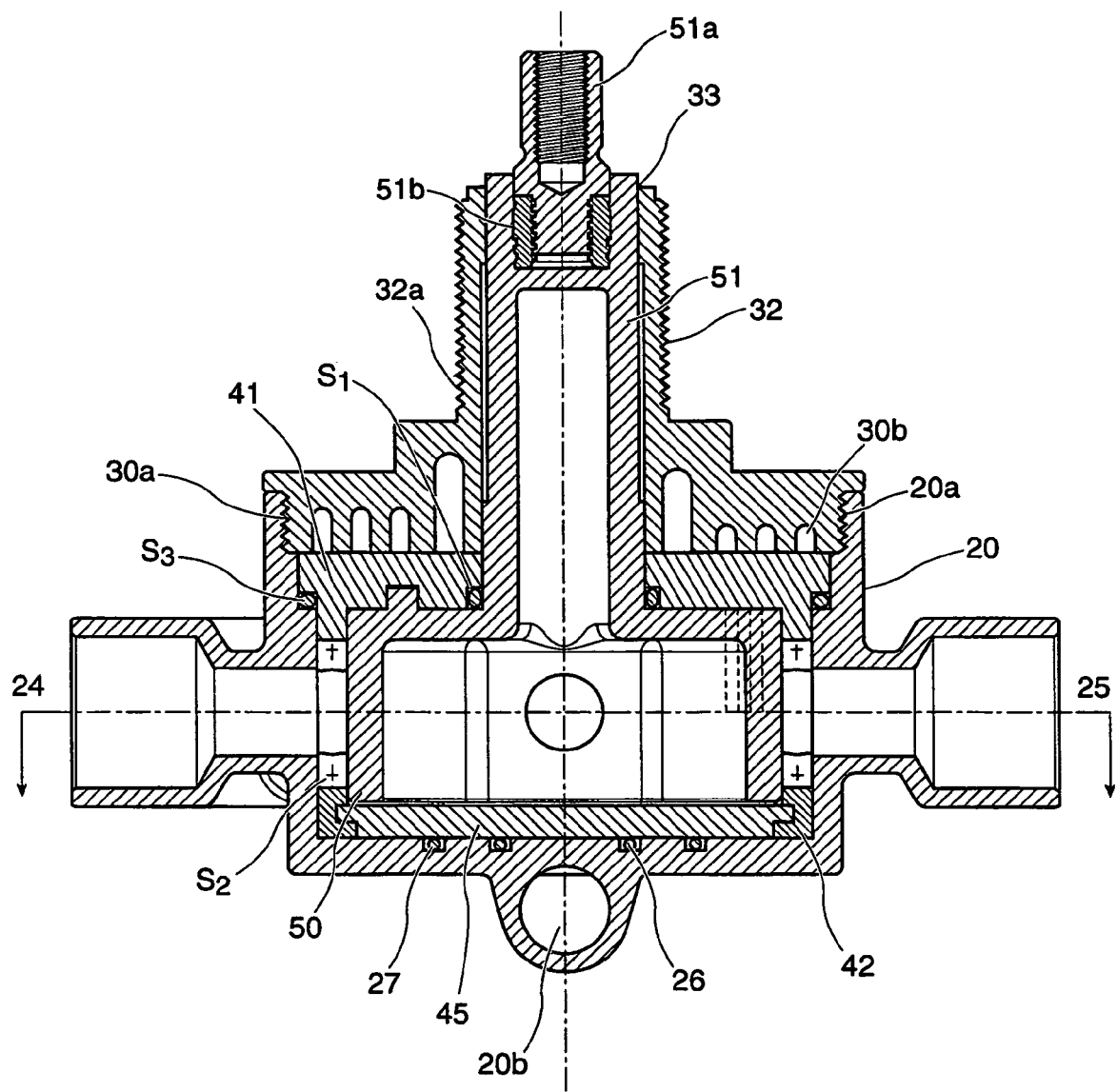
FIGS. 2A and 2B illustrate the preferred embodiment of the invention in cross section with particular reference to the improvement related to the ceramic disk thereof and the simplification of the valve in relation to Applicant's prior development discussed in the Background of the Invention.
Figure 4:
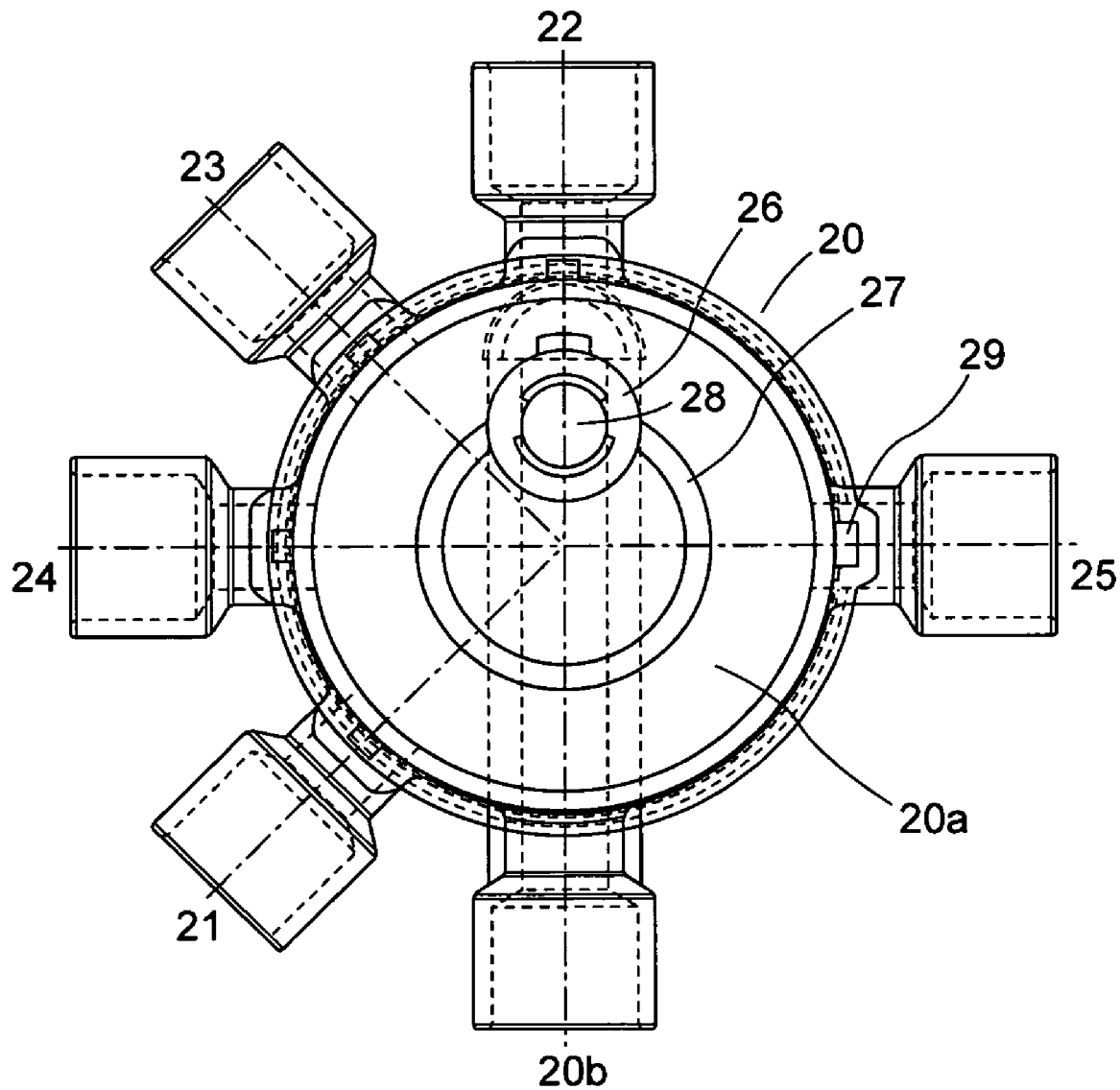
FIG. 4 is a top view of the housing of FIG. 3 illustrating the various elements therefore and shown in a preferred embodiment of the invention.
Figure 4A:
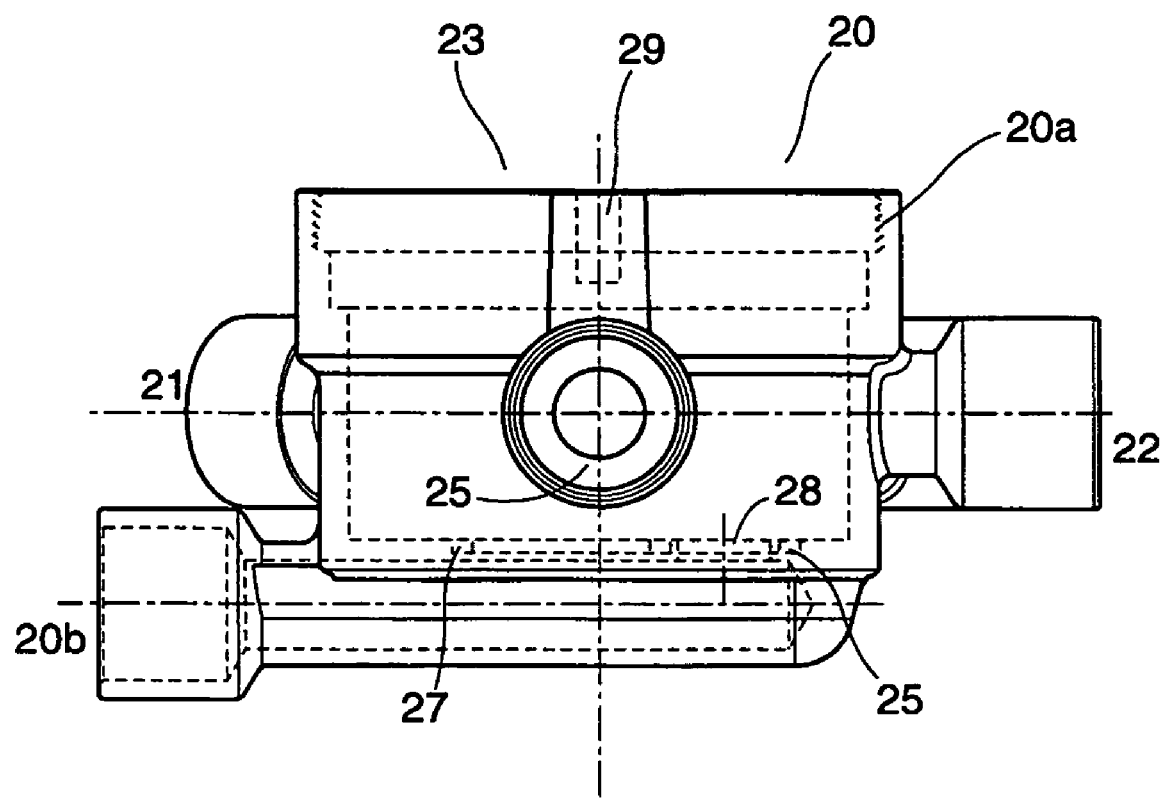
FIG. 4A is a side perspective view of the housing shown in FIG. 4.
Figure 4B:
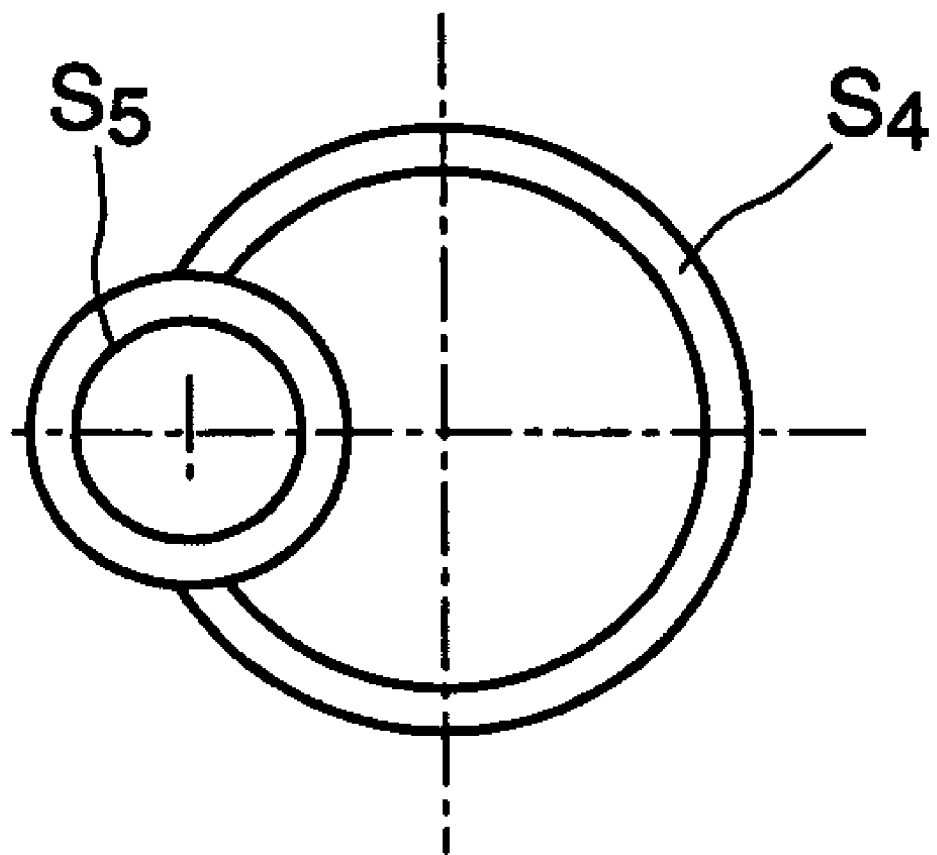
FIG. 4B is a top view of the sealing porting retained in channels (26 and 27) of housing (20) shown in FIG. 4 and illustrated in a preferred embodiment of the invention.

As best seen in FIG. 4, FIG. 1 and FIG. 2 a housing (20) is provided which includes an opening (20a) wherein the cartridge (15) will be inserted in use. An alignment (29) is provided in the housing typically made from brass to align with the alignment tab (49) of the stationary sleeve (40) to ensure that all ports of the cartridge are in alignment with the outlets (21 through 25) of the housing. At the bottom of the opening (20a) there is found channels (26 and 27) in order to accommodate the seal (S4 and S5) of FIG. 4B. The seal (S5) circumscribes the inlet opening (28) extending from the inlet (20B) of the valve housing. In this manner water from a typical hot and cold water supply valve may enter the multiport valve and be diverted in a manner which will be described hereinafter as can be seen in part in relation to FIG. 4A by the rotation of the rotary stem sleeve (50) which will be described hereinafter.

As seen in FIG. 3 when the alignment tab (49) of the cartridge is contained within the channel (29) and the housing (20) all of the seals (S2) of the stationary sleeve (20) will be aligned with their respective outlet port. The seals (S2) are designed to extend in part into the outlet ports (21 through 25) by the slight chamfering of these outlets so that the seal may be compressed and provide a very positive seal indeed within each of the outlets (21 through 25). The cartridge (15) will therefore be positioned within the housing (20) and retained in position by the threaded retaining member (30) which as best seen in FIG. 1A through 1E as a perimeter adjacent the bottom thereof including a threading (30A) which will mate with the threading provided in the housing (20) and (20A) so that the cartridge (15) will be retained in the housing (20) by the very positive location of retaining member (30) in the housing via the threading thereof. The retainer includes an opening (33) at the other end thereof to receive the spindle (51) of the rotary sleeve (50). The portion (32) in the form of a threaded cylinder about the exterior thereof as best seen in FIG. 1B will provide for fastening of trim portions to the valve assembly. The nut portion (31) can be used to tighten the retainer (30) in position. The retainer is rigidified by various rib portions (30B) which reduced the weight of the retainer while strengthening said retainer. In this manner all of the stop portions and retaining elements provided in U.S. Pat. No. 6,196,266 have been eliminated and the entire multiport valve assembly improvements have been radically simplified by providing the cartridge assembly and the elimination of unnecessary sealing portions and related elements.

Figure 5:
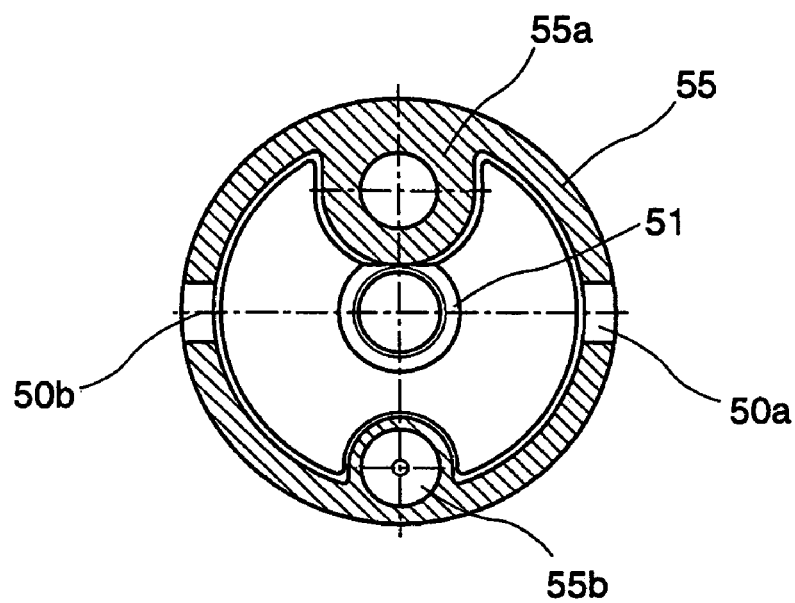
FIG. 5 is a top cross sectional view of the moveable stem sleeve (50) as seen in FIG. 2 illustrated in a preferred embodiment of the invention.
Figure 5A:
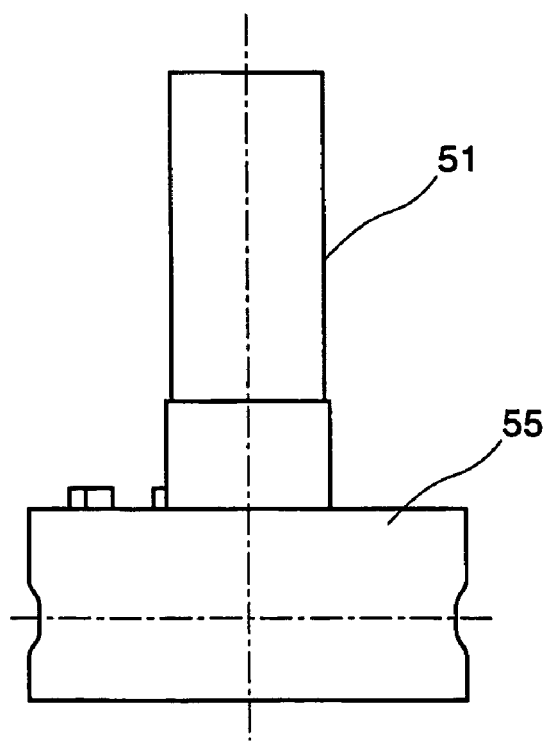
FIGS. 5A, 5B and 5C are side, top and cross sectional views of the moveable stem sleeve as seen in FIG. 2 and illustrated in the preferred embodiments of the invention.
Figure 5B:
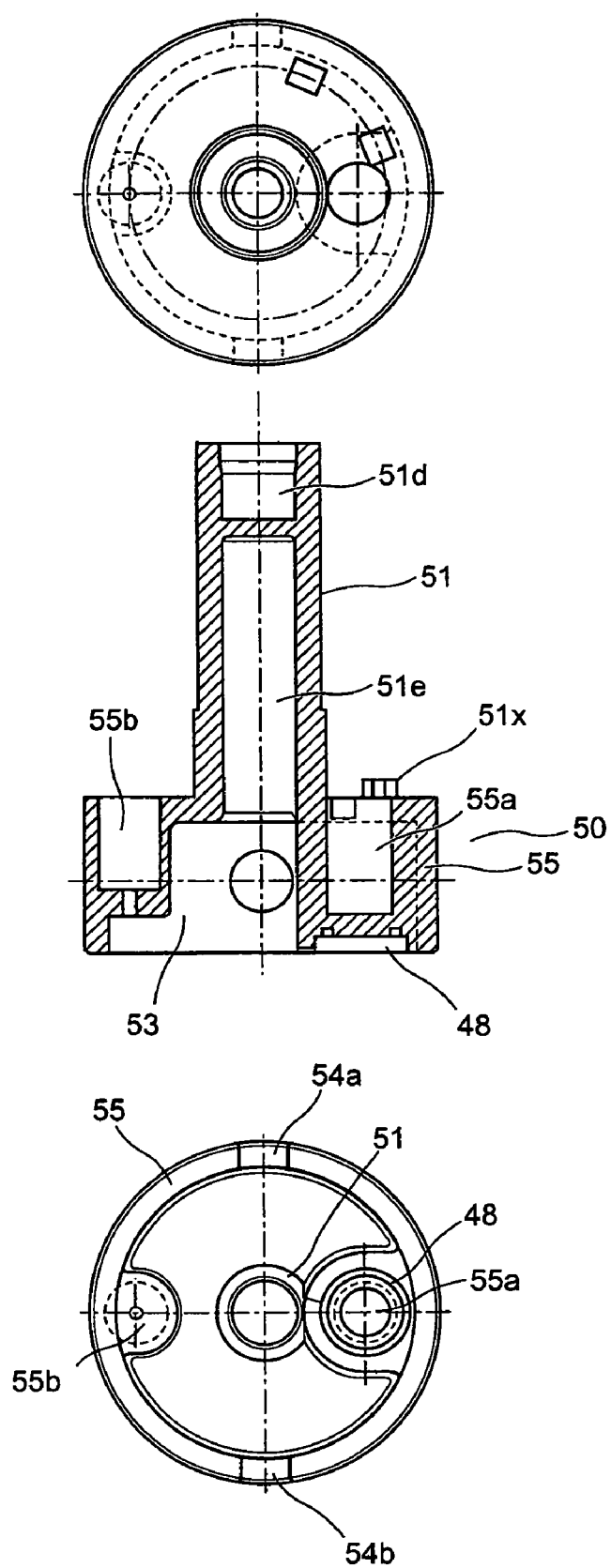
Figure 5C:
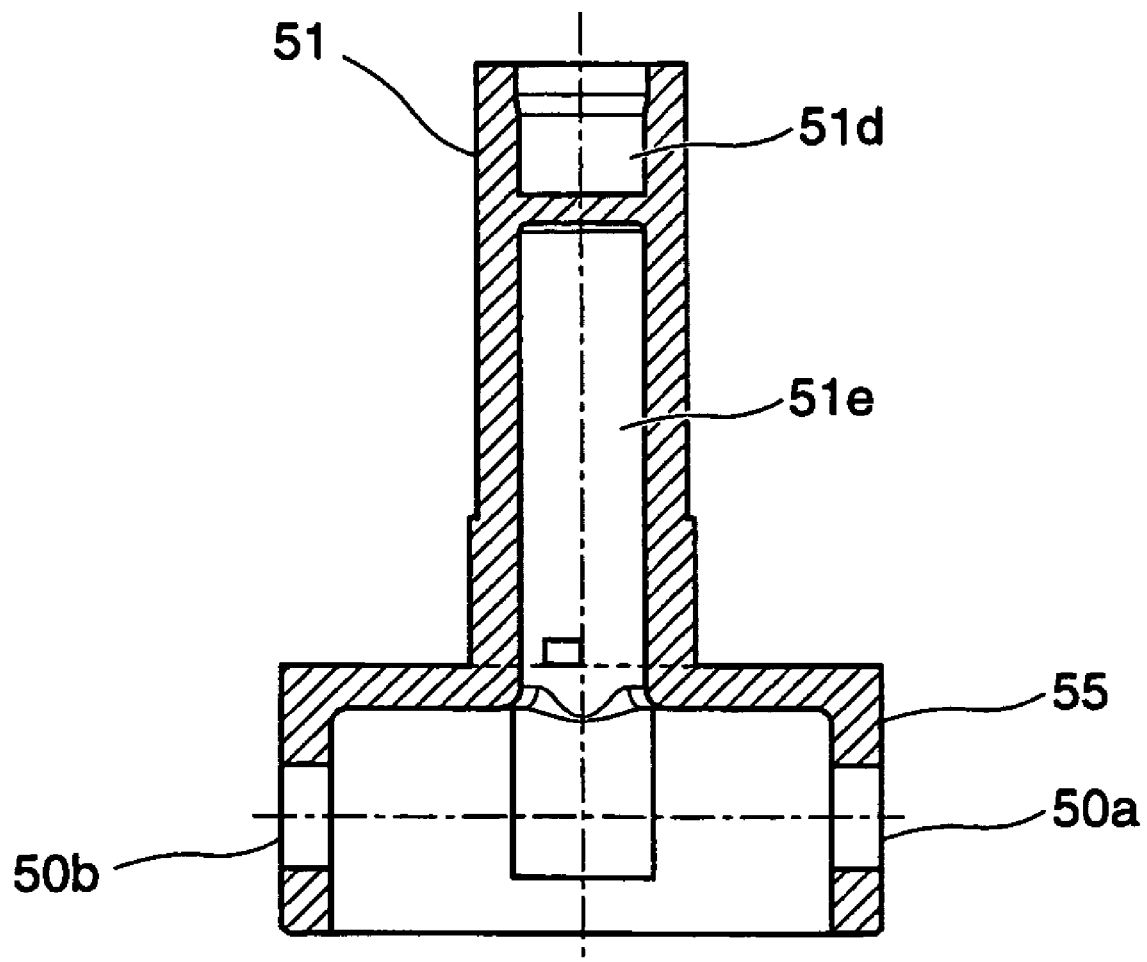
Figure 6:
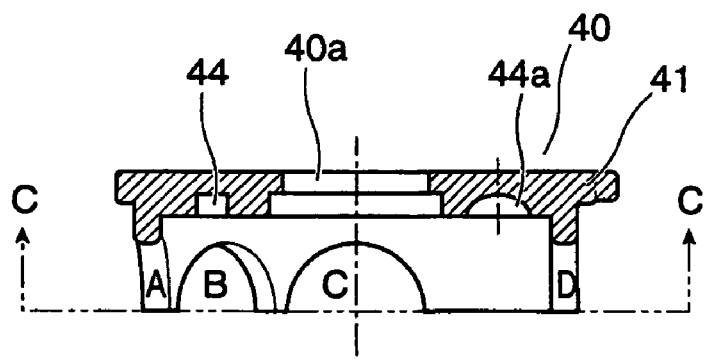
FIGS. 6, 6A, 6B, 6C and 6D illustrate cross sectional, bottom and schematic perspective view of the top portion (41) of the stationary sleeve (40) illustrated in a preferred embodiment of the invention.
Figure 6A:
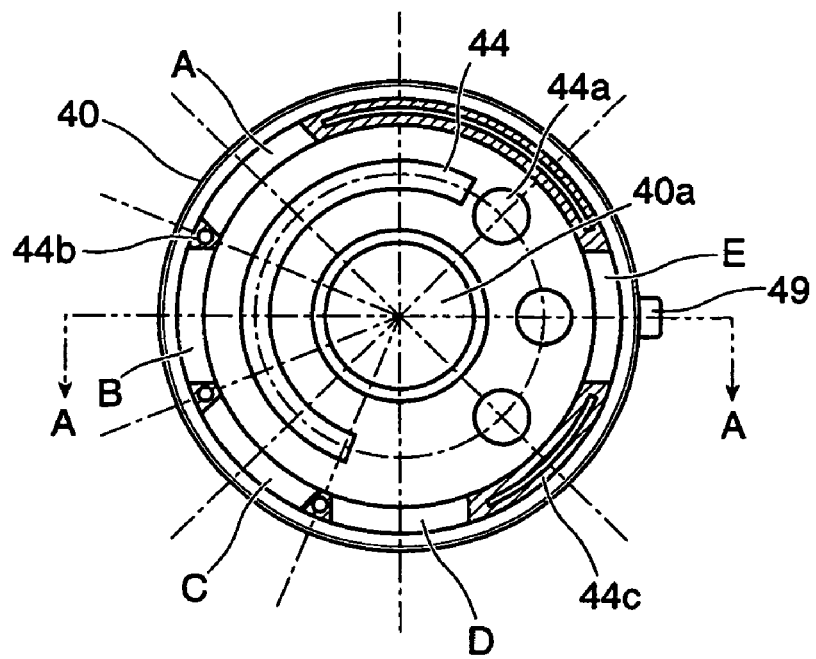
Figure 6B:
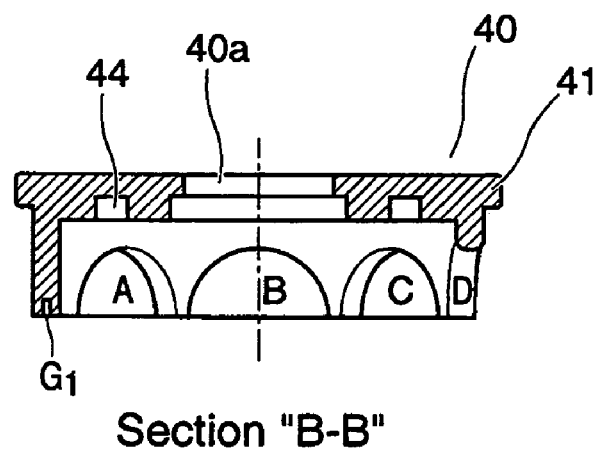
Figure 6C:
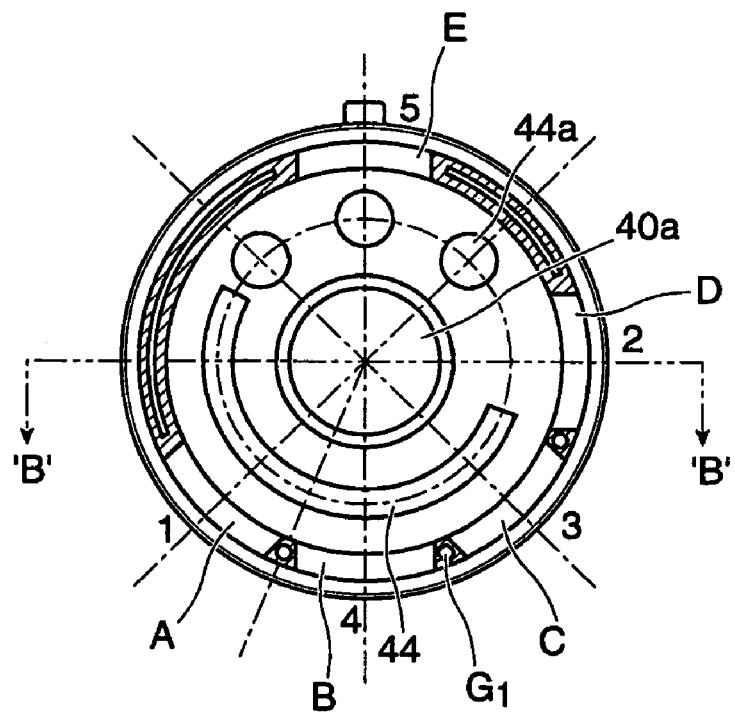

As best seen in FIG. 5B the rotary stem sleeve (50) includes a pocket (55B) to contain resiliently biased keeper (B) with the appropriate spring (T) to be held at various stop positions (44A) as best seen in FIG. 6A to orient the outlets of the rotary sleeve (50A and 50B) with respect to the various facilities of FIG. 3. Rotary sleeve stem (50) also includes a ceramic disk cutout opening area at (48) to retain and hold these rotating ceramic disk (59) therein via the little cleat portions as shown in FIG. 5B. The rotary stem sleeve includes limit stops (51X) which travel within the grooves (44) provided with the top portion of the stationary sleeve (40) to limit the rotation of the rotary sleeve, in unison with the ball bearing engaging the various stop positions at (44A). The stem sleeve may contain one or two outlets (50A and 50B) depending on the number of body shower outlets provided as best seen in FIG. 3 when the stem sleeve is rotated so that the water path is aligned with the body shower outlet ports (24 and 25) to be readily seen from FIG. 3 that both outlet ports (50A and 50B) are in alignment with said body shower outlets. However, if the outlet (50B) were aligned with the spout the other outlet (50A) would not be in use. Typically, one outlet will align with the shower head, the hand shower and the spout, and both will align with the body shower to enable the user to have body shower valves installed on each side of the shower stall. The stem portion (51) of the stem sleeve (50) extends up through the threaded cylinder portion (32) of retainer (30) and has installed within the opening (51D) as best seen in FIG. 1, a brass fitting having pinions as a teeth which is typically known for fastening of a handle portion. The brass portion is retained within the neck of the spindle via a retaining portion (51B). The brass portion (51A) may also be threaded internally so as to receive a fastener (not shown).

Figure 2B:
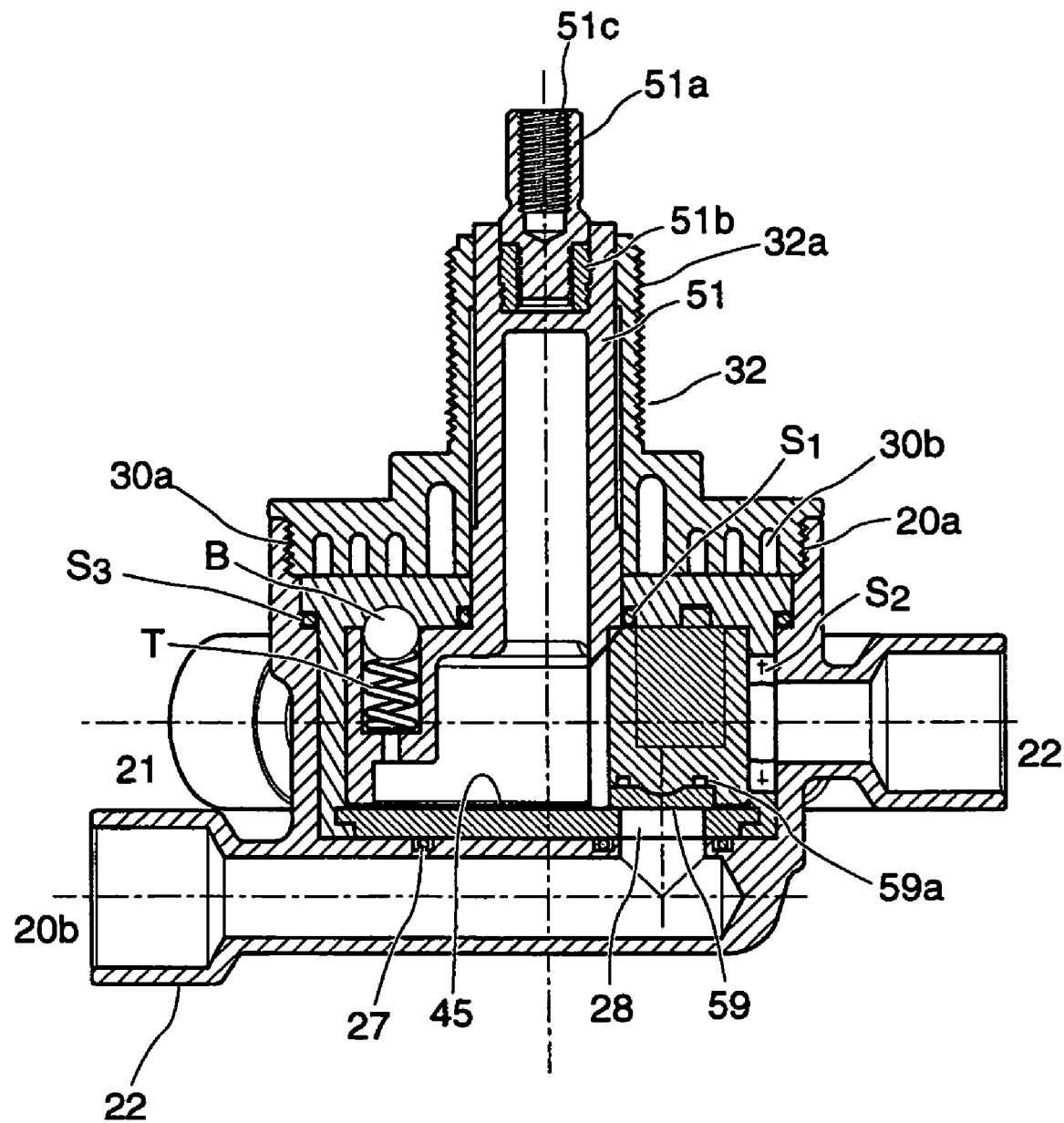
Figure 6D:
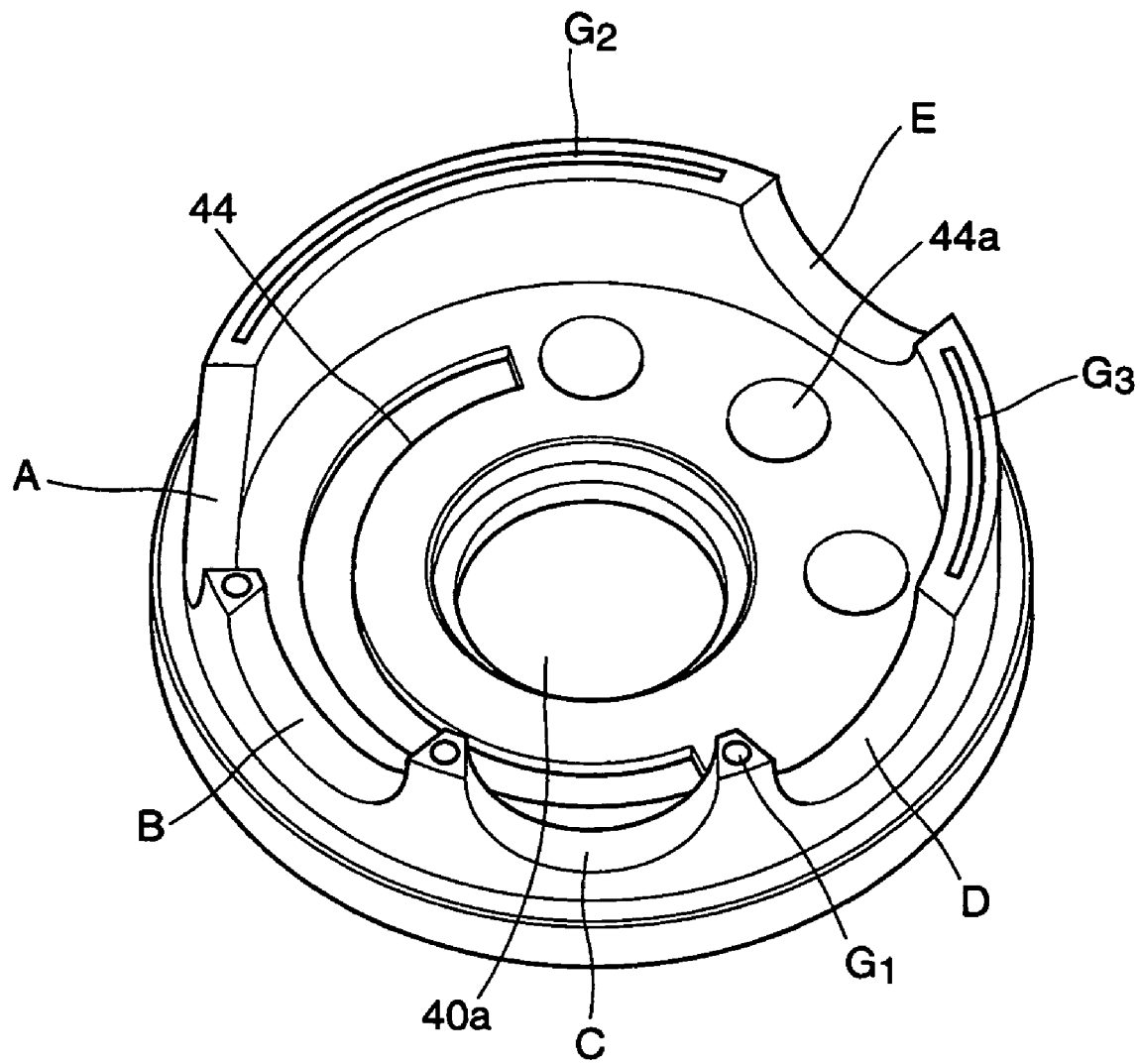
Figure 7:
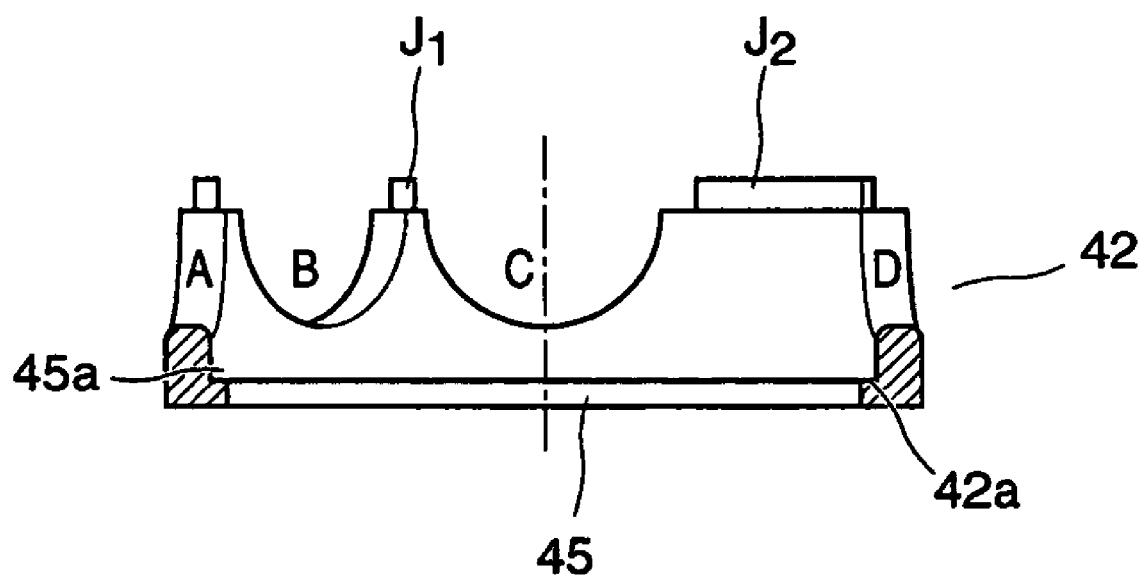
FIGS. 7, 7A, 7B and 7C are side, top, and schematic views of the bottom portion (42) of the stationary sleeve (40) illustrated in a preferred embodiment of the invention.
Figure 7A:
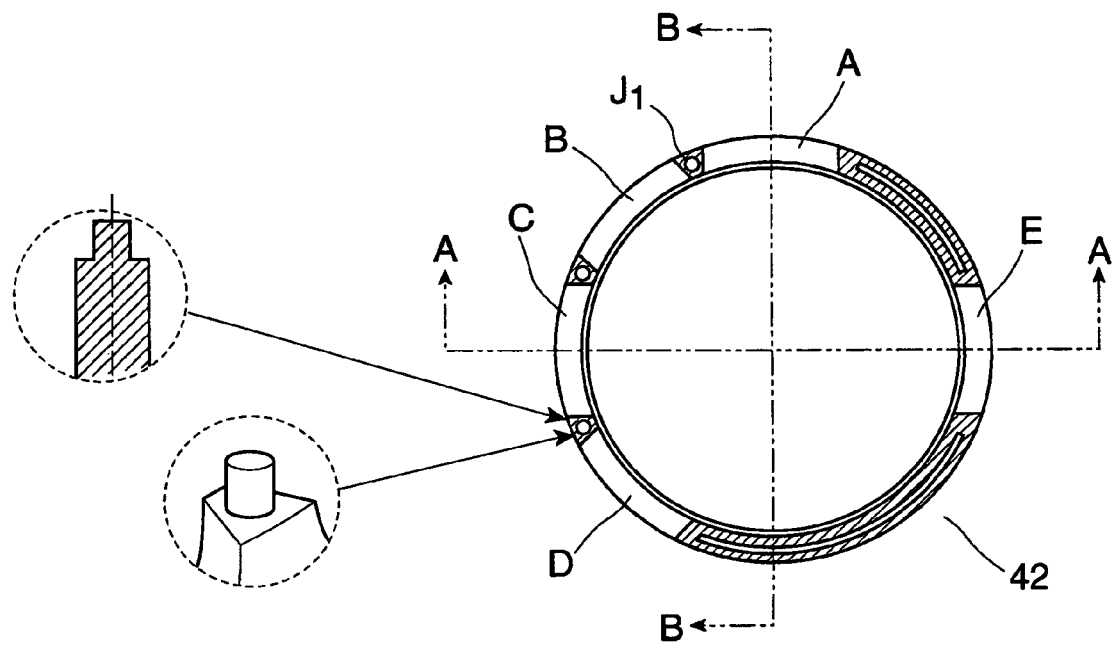
Figure 7B:
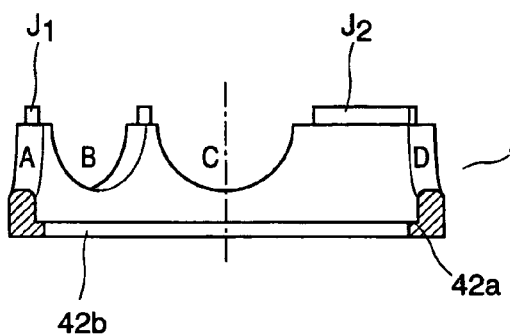
Figure 7C:
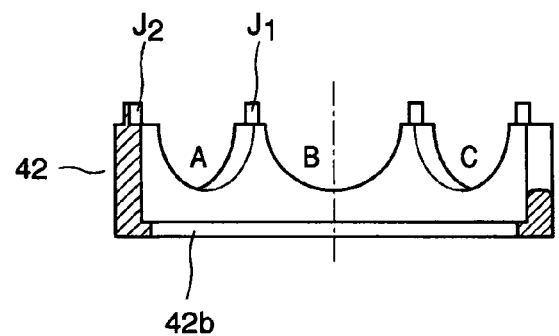
Figure 9:
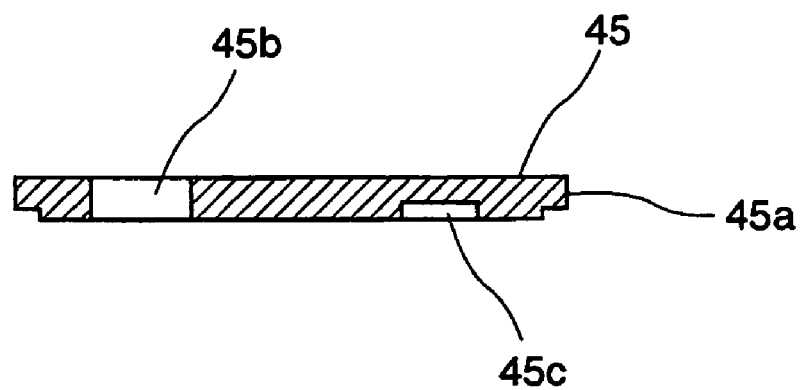
FIG. 9 and 9A illustrate cross sectional and top views of a ceramic disk (45) fixed within the stationary sleeve for and illustrated in a preferred embodiment of the invention.

Referring now to FIGS. 6 through 6D there is illustrated a top portion (41) of the stationary sleeve (40) which includes ports (A, B, C, D and B) which align with the facilities shown in FIG. 3 when tab (49) is installed within the housing engaging cut out (29). Stops (44A) are provided from the bottom of the top portion (41) to receive ball bearing (B) as spring biased to spring (E) to ensure the positive stop location for each of the facilities of FIG. 3 within the limits of travel of the rotary stem sleeve (50) within the stationary sleeve (40). Various pin locations (G1) provided so as to allow for the engagement of the top (41) and the bottom portion (42) of the stationary sleeve (40). This can be best seen in relation to FIG. 6D. A mating (10) portions can be readily seen in relation to FIG. 7, wherein the ports A, B, C and D will be perfectly aligned by the pin portions (J1) and fastening appendages (J2) in alignment with various ports (G1 and G2) of the top portion (41). The bottom portion (42) of FIG. 7 includes a ledge (42A) and an opening (42B) wherein a stationary ceramic disk (45) may be positioned, the geometry of which can be best seen in relation to FIGS. 9 and 9A. The ceramic disk therefore is retained in position within opening (42B) and held in position at ledges (42A) via the corresponding portions (45A) at the perimeter of the ceramic disk as seen in FIG. 9. The ceramic disk also includes an inlet port (45B) extending there through which will be closed by their rotating ceramic disk (59) carried by the rotary stem sleeve (50) which can be seen in FIG. 10 in relation to FIG. 2B. When the two portions (41 and 42) are therefore assembled, it is important that the ceramic disk be positioned in portion (42) prior to assembly and prior to any ultrasonic welding which will complete the cartridge. Of course, the stem sleeve (50) must also be contained within the components (41 and 42) prior to ultrasonic welding or the like. All components must be installed. Once the cartridge is totally assembled, it may be placed within the housing (20) as described above by orienting the tab portions (29) with tab portion (49). The cartridge will therefore be correctly positioned without the necessity of having to provide all of the stops and related portions taught in U.S. Pat. No. 6,196,266. In the closed position therefore, the valve will be as seen in FIG. 2B.

When it is desired to divert water to the various facilities seen in FIG. 3 the handle portion connected to the stem (51) of stem sleeve (50) will be rotated to the desired position. As the rotary stem sleeve (50) is rotated in relation to the stationary sleeve (40) and at the various stop positions for the ball bearing (B) as seen in relation to FIG. 3, the various outlet ports (50A and 50B) of the stem sleeve will be in selective alignment with the desired outlet facility of FIG. 3 and water will be allowed to enter the valve through the inlet passage (20B) into the inlet (28) through the port (28) when the rotating ceramic disk (59) is out of alignment with that port through the interior of the valve and particularly the rotating stem sleeve as seen in FIG. 3 to the desired outlet in selective alignment with the water inlet.

The entire inlet is therefore properly sealed proximate the opening (28) via the seals located within the channels (26 and 27, S4 and S5) to prevent water from passing around the ceramic disk to any of the outlet ports but only enter through inlet (28) into the valve cartridge to be diverted to the desired facility as described previously.

By providing a ceramic disk that is stationary and that rotates in order to allow water to flow to the desired facility the overall reliability of the valve has been vastly improved in relation to the prior art. The valve is much simpler to assemble and manufacture and replacement becomes very simple with the necessity of a skilled plumber in that regard.

Figure 9A:
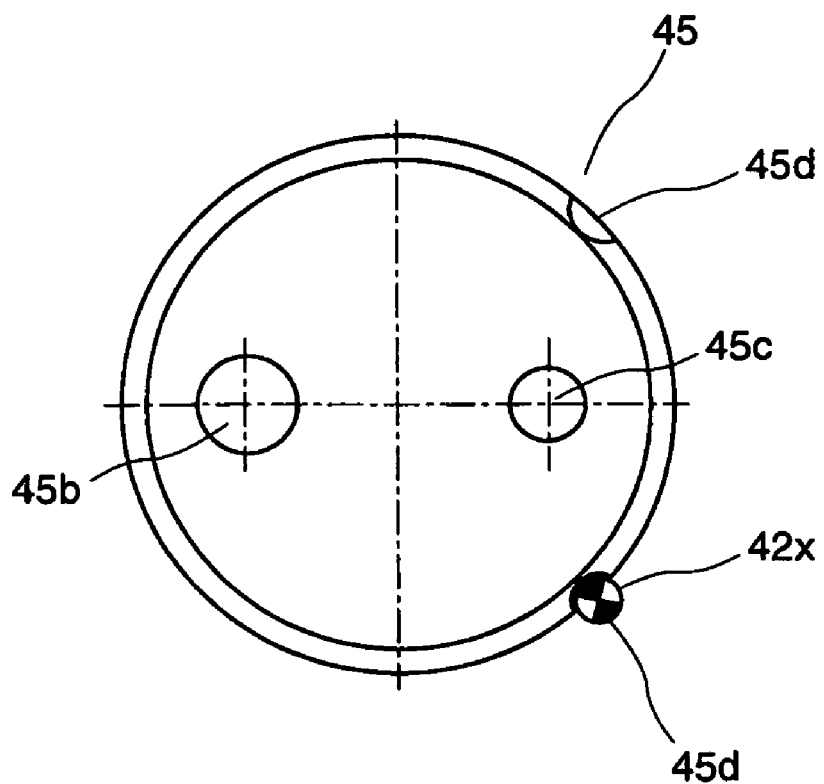
Figure 10:
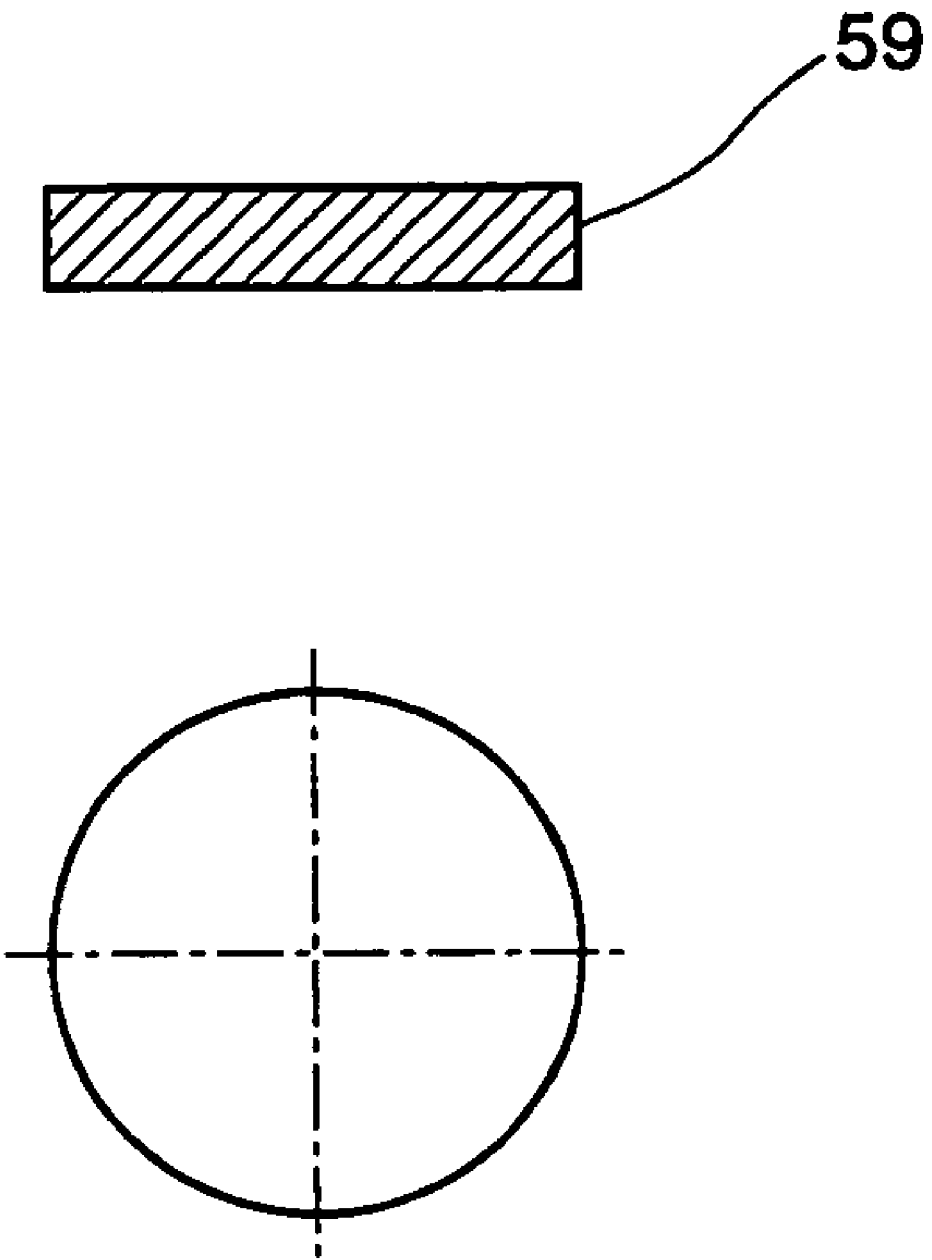
FIG. 10 is a cross sectional view of the rotating ceramic disk (59) carried by the rotating stem sleeve (50) and illustrated in a preferred embodiment of the invention.

Pin portion (42X) of portion (42) as in FIG. 9A in cooperation with cut outs (45D) assist with the retention of the stationary ceramic disc (45) in stationary sleeve (40).

As many changes can be made to the preferred embodiments of the invention without departing from the scope of the invention; it is intended that all material contained herein be interpreted as illustrative of the invention and not in limiting sense.

The embodiments of the invention in which an exclusive property or privilege is claimed are as follows:

1. A diverter valve comprising, a preferably cylindrical housing having a perimeter, and a water inlet, preferably disposed below, a plurality of water outlets disposed at predetermined spaced intervals about the perimeter of said housing, said diverting valve containing a removable cartridge disposed in said housing for selectively aligning the water inlet of said housing to at least one of the plurality of water outlets of said housing, said cartridge including a stationary sleeve having a plurality of water outlet ports disposed at predetermined spaced intervals and permanently aligned with and sealed in relation to said plurality of water outlets of said housing when said removable cartridge is installed in said housing, said cartridge including a rotary stem sleeve contained within said stationary sleeve, said rotary stem sleeve having an inlet, at least one outlet, and a handle spindle connected to said rotary stem sleeve and extending from said diverter valve for manually rotating said rotary stem sleeve within said cartridge, said stationary sleeve including a preferably ceramic disk disposed therewith preferably proximate the bottom of said stationary sleeve and including a water inlet port in registration with the water inlet of said housing to allow water to enter the cartridge, said rotary stem sleeve including an interior and carrying a preferably ceramic disk therein moveable in and out of registration with the water inlet port of said ceramic disk of said stationary sleeve when said rotary stem sleeve is rotated to fully close and open said water inlet port and thereby allow water to enter said cartridge and to thereafter selectively align the at least one outlet of said rotary stem sleeve with at least one of the plurality of water outlets of said stationary sleeve and said housing by the pre-selected degree of rotation of said rotary stem sleeve.

2. The valve of claim 1 wherein the housing has a threaded interior substantially proximate an open end thereof for receiving said cartridge and for engagement with a threaded retainer provided with said valve to removably retain the cartridge within said housing, said threaded retainer also having an opening for said spindle preferably a cylindrical collar, which may be threaded on the exterior thereof to allow attachment of appropriate trim portions adjacent a handle.

3. The valve of claim 1 wherein said spindle extending from said rotary stem sleeve is made from plastic material, but the handle engaging fitting is made from brass and is retained in said spindle.

Figure 8:
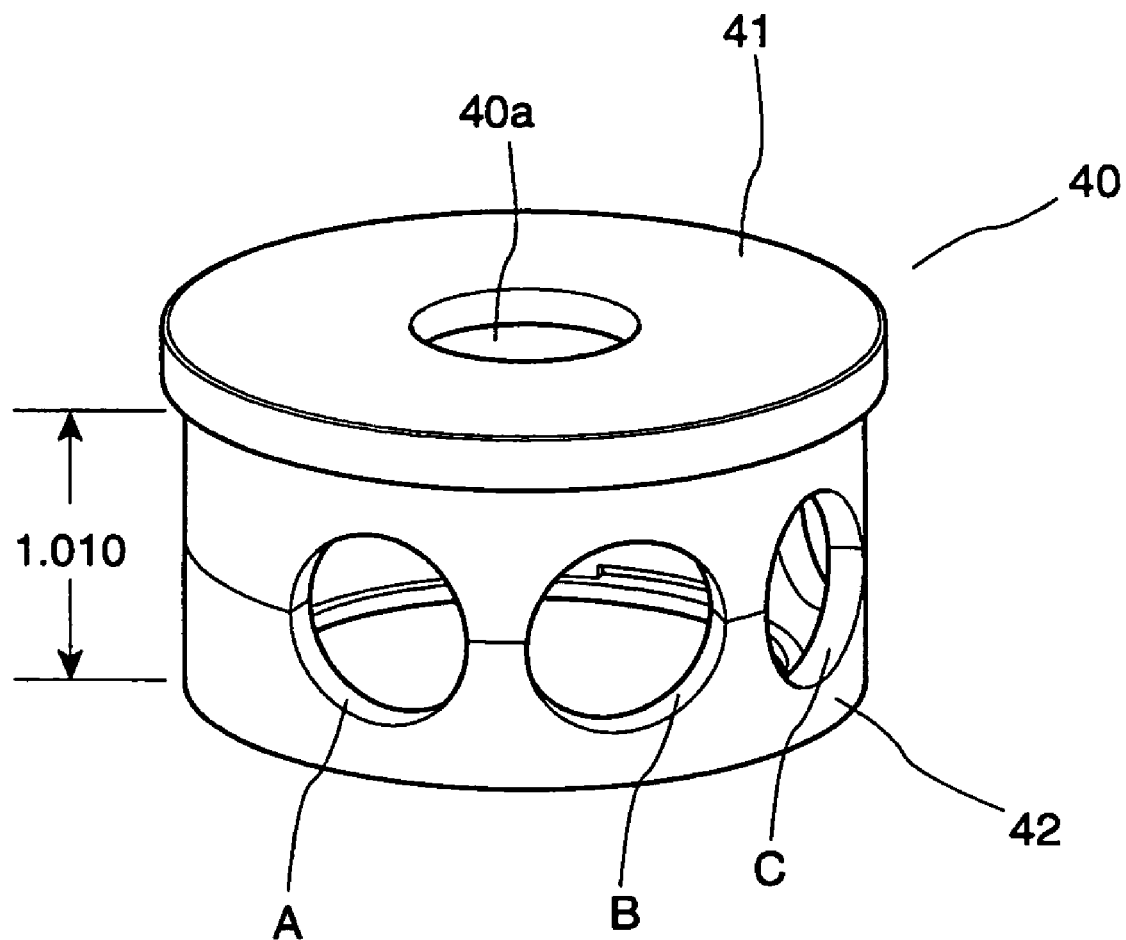
FIGS. 8 and 8A are top and bottom perspective views of the stationary sleeve (40) illustrated in the components thereof illustrated in the preferred embodiment of the invention.
Figure 8A:
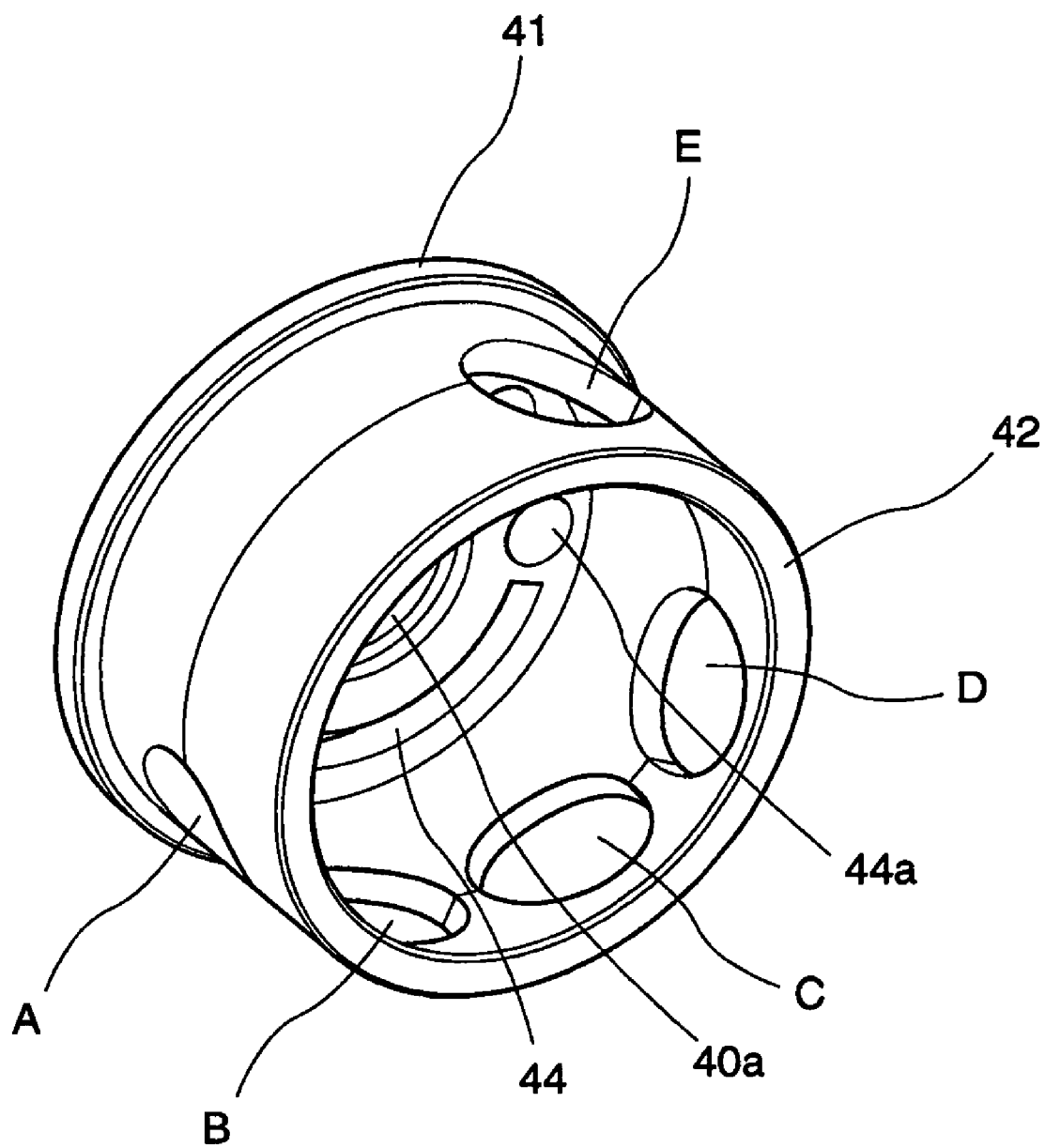

4. The valve of claim 1 wherein said housing includes a bottom and has contained therewith a seal, preferably generally figure 8 in shape to seal the inlet to the valve in relation to the rotating and stationary ceramic disks.

5. The valve of claim 1 wherein said housing includes a channel and said cartridge includes a mating tab to ensure correct alignment of all functions of said valve.

* * * * *